United States Patent [19]
de la Fuente et al.

[11] Patent Number: 5,558,182
[45] Date of Patent: Sep. 24, 1996

[54] BENDING AND TORSION LOAD ALLEVIATOR WITH AUTOMATIC RESET

[75] Inventors: Horacio M. de la Fuente, Friendswood, Tex.; Michael C. Eubanks, Tulsa, Okla.; Anthony X. Dao, Friendswood, Tex.

[73] Assignee: The United States of America as represented by the Administrator of the National Aeronautics and Space Administration, Washington, D.C.

[21] Appl. No.: 428,743

[22] Filed: Apr. 25, 1995

[51] Int. Cl.⁶ .................................................. F16D 63/00
[52] U.S. Cl. ............................ 188/67; 267/284; 267/205
[58] Field of Search ...................... 188/67, 82.4, 82.9, 188/129, 134, 166; 267/28, 134, 140.5, 150, 172, 205; 403/59, 220, 229, 291

[56] References Cited

U.S. PATENT DOCUMENTS

| | | | |
|---|---|---|---|
| 3,118,660 | 1/1964 | Saniewski | 267/284 |
| 3,383,883 | 5/1968 | Dutaret | 64/27 |
| 3,500,701 | 3/1970 | Gussenbauer et al. | 188/67 X |
| 4,669,584 | 6/1987 | Santos | 188/134 |
| 4,741,642 | 5/1988 | Carlton | 403/59 |
| 5,086,901 | 2/1992 | Petronis et al. | 192/150 |
| 5,197,573 | 3/1993 | de la Fuente et al. | 188/67 |
| 5,213,436 | 5/1993 | Fichtner et al. | 403/220 |

FOREIGN PATENT DOCUMENTS

| | | | |
|---|---|---|---|
| 911939 | 12/1962 | United Kingdom | 267/172 |

Primary Examiner—Josie Ballato
Attorney, Agent, or Firm—James M. Cate

[57] ABSTRACT

A force transmitting load alleviator apparatus 10 and method are provided for rotatably and pivotally driving a member to be protected against overload torsional and bending (moment) forces. The load alleviator 10 includes at least one bias spring 42 to resiliently bias cam followers 18 and cam surfaces 22 together and to maintain them in locked engagement unless a predetermined load is exceeded whereupon a center housing 12 is pivotal or rotational with respect to a crown assembly 14. This pivotal and rotational movement results in frictional dissipation of the overload force by an energy dissipator 16. The energy dissipator 16 can be provided to dissipate substantially more energy from the overload force than from the bias force that automatically resets the center housing 12 and crown assembly 14 to the normally fixed centered alignment. The torsional and bending (moment) overload levels can designed independently of each other.

22 Claims, 4 Drawing Sheets

BENDING AND TORSION LOAD ALLEVIATOR WITH AUTOMATIC RESET

ORIGIN OF THE INVENTION

The invention described herein was made by employees of the United States Government and may be manufactured and used by or for the Government of the United States of America for governmental purposes without payment of any royalties thereon or therefore.

FIELD OF THE INVENTION

The present invention relates to equipment and techniques for limiting bending and torsional loads between components. More particularly, this invention relates to improved techniques for dissipating a large portion of the energy associated with high input moment and torque, and for controllably returning components to their initial configuration once the high input load is removed.

BACKGROUND OF THE INVENTION

Coil springs have been used for decades to provide moment and torque protection between components. A coil spring interconnecting two components thus allows bending (moment) and torsional loads placed on a first component to be reduced and safely transmitted to the interconnected second component, thereby reducing the likelihood of a structural failure of the connection. A coil spring practically does not dissipate much of the input energy, but rather stores the input energy within the spring. If the input load is slowly built up then quickly eliminated, the released stored energy may be damaged by the quick release of the slowly input load.

U.S. Pat. No. 5,213,436 discloses a spring joint for pivotally connecting two members. A flexible torsion rod of the type generally disclosed in U.S. Pat. No. 3,118,660 is employed. A stop limits movement of the torsional rod to prevent the elastic range of the rod from being exceeded.

U.S. Pat. No. 3,118,660 discloses a torsional spring useful as a vehicular shock absorber. The device converts linearly reciprocating motion to torsional motion. The device includes an elastic torsion shaft and a pair of cam tracks on end faces of cylindrical members for imparting a twisting motion on the torsion shaft. The device is intended to limit reciprocating motion between components, and is not suitable for limiting bending and torsional loads.

U.S. Pat. No. 3,383,883 discloses a flexible coupling including axially displaceable crown gears. The flexible coupling reduces shocks and vibrations between shafts, but does not dissipate energy to provide torsional or pivotable overload protection.

An inertial stop designed to limit sudden movement between components is disclosed in U.S. Pat. No. 4,669,584. In one embodiment, the device is intended to allow limited slow rotation of one component relative to another, but is designed to limit sudden rotation between components. The device relies upon the inertia of the block, and does not limit bending and torsional loads between components.

U.S. Pat. No. 4,741,642 discloses a safety joint for a robotic arm. Linear and rotational motion between joint components is obtained by the combination of a spring acting against the weight of member 30, while a bell rod socket arrangement limits rotational motion between joint components. A breakaway action allows the release of joint components in response to excessive forces. U.S. Pat. No. 5,086,901 discloses a more elaborate overload detection device for a robotic arm. A coil spring maintains a driving member and a driven member with mutual alignment. A trip-point switch is designed to provide overload detection, but the device does not provide a force dissipating mechanism for absorbing a portion of the input moment or torque.

Many of the devices disclosed in the prior art are complex, and cannot practically be used for various applications to limit loads between components to a predetermined safe level. More particularly, prior art devices do not dissipate a significant portion of the bending and torsional energy input from one component, and accordingly significant energy is present when components return to their original configuration once the load is removed.

The disadvantages of the prior art are overcome by the present invention, and improved equipments and techniques are hereinafter disclosed for reliably limiting both bending and torsional loads between components. The device of the present invention utilizes a spring strut structure to dissipate excessive input forces. The spring strut structure automatically returns the components to their original configuration with a low energy once the excessive load is removed.

SUMMARY OF THE INVENTION

The present invention provides apparatus and methods for limiting torsional and bending forces applied to a driven member and automatic resetting after the overload is dissipated.

A load alleviator is provided that comprises a crown assembly with a plurality of cam surfaces circumferentially spaced about a portion thereof. A center housing is provided to have an end portion thereof engageable with the crown assembly. The end portion has thereon a plurality of cam followers for engaging respective ones of the plurality of cam surfaces. The energy dissipator has a dissipator body and an elongate member. The elongate member is axially moveable within the dissipator body member. The energy dissipator is operable to dissipate energy as a result of relative axial movement between the dissipator body and the elongate member.

First and second connectors are provided for securing the crown assembly to the center housing by securing the energy dissipator between the crown housing the center housing. The connectors are operative to allow a range of angular deflection of the crown assembly relative to the center housing. The connectors also allow for relative rotation between the crown assembly and the center housing. The biasing member is provided for biasing the crown assembly toward the center housing such that the cam followers are biased towards engagement with the cam surfaces.

The cam surfaces are preferably profiled such that relative rotation in a first direction of the center housing with respect to the crown assembly results in movement of the crown assembly away from the center housing and such that subsequent relative rotation in an opposite direction results in movement of the crown assembly toward the center housing responsive to the biasing member. The energy dissipator is secured to the crown assembly and the center housing. In a preferred embodiment, the energy dissipator is operable to dissipate significantly more energy as a result of the relative movement of the crown assembly in a direction away from the center housing than as a result of relative movement of the crown assembly in a direction toward the center housing. Thus, a torsional force converter is provided for converting torsional force above a predetermined level applied between a first and second member into translational movement of the first member with respect to the second member. A lateral force converter is provided for converting lateral force above a predetermined level applied to at least one of the first and second members into pivotal movement or angular deflection of the first member with respect to the second. At least one of the first and second members is secured to the driven member.

It is an object of the present invention to provide an improved bending and torsion load alleviator.

It is a further object of the present invention to provide moment and torque protection to a structural component by limiting the transmitted moment and/or torque to a predetermined value.

It is another object of the present invention to dissipate a large portion of the energy associated with an excessively high input moment or torsional force.

It is yet another object of the present invention to automatically return the device to the initial configuration with lower energy once the excessive input load is removed so as to be ready to provide further load protection.

A feature of the present invention is a bending moment and torsional load limiting device.

Another feature of the present invention is a bending moment and torsional load limiting device with significant energy dissipation of excessively high pre-determined load levels.

Yet another feature of the present invention is a bending moment and torsional load limiting device capable of providing automatic reset of the same after removal of the excessive load.

Yet another feature of the present invention is a bending and load limiting device where the bending and torsional set points are predetermined and independent of each other.

Yet another feature of the present invention is an energy absorbing moment and torsional load limiting device capable of accommodating various types of energy absorbers.

Yet another feature of the present invention is an energy dissipator with an automatic reset that dissipates energy with sliding friction and that contains an adjustable and even removable initial stroke dead band.

An advantage of the present invention is a preload method for reducing any dead band at the beginning of the stroke that is especially advantageous for short strokes.

Another advantage of the present invention is a load alleviator that can be designed for use to protect driven members in a wide range of applications from industrial robotic systems to commercial hand held tools.

Yet another advantage of the present invention is that the load alleviator can be designed to be in close proximity (within 0.25 inches) to the structure it protects.

These and other objects, features, and advantages of the present invention will be disclosed in the subsequent detailed description, claims, and associated drawings.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF THE INVENTION

Figure 1:
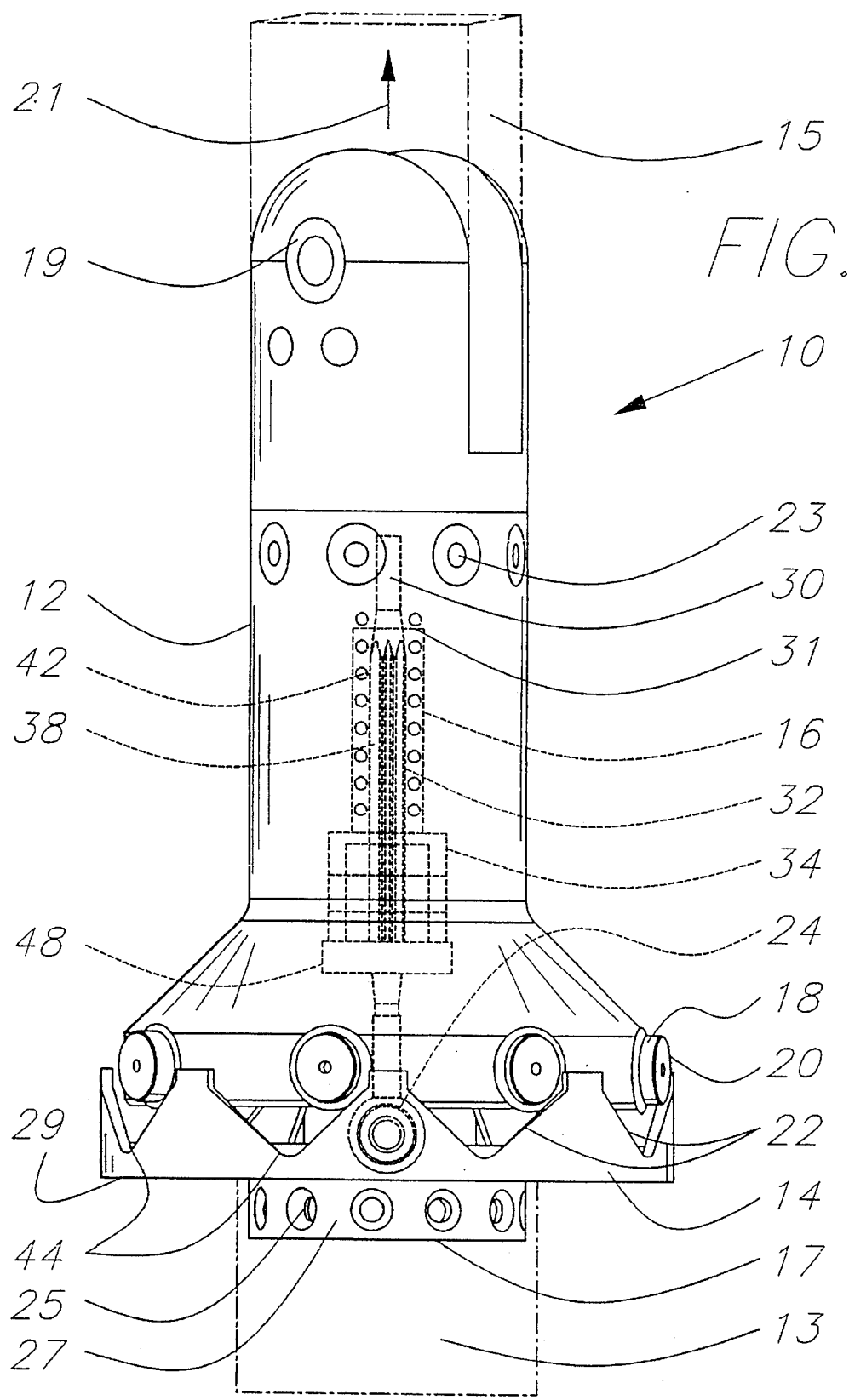
FIG. 1 is an elevational view of a load alleviator in accord with the present invention acting in response to a torsional overload force.
Figure 2:
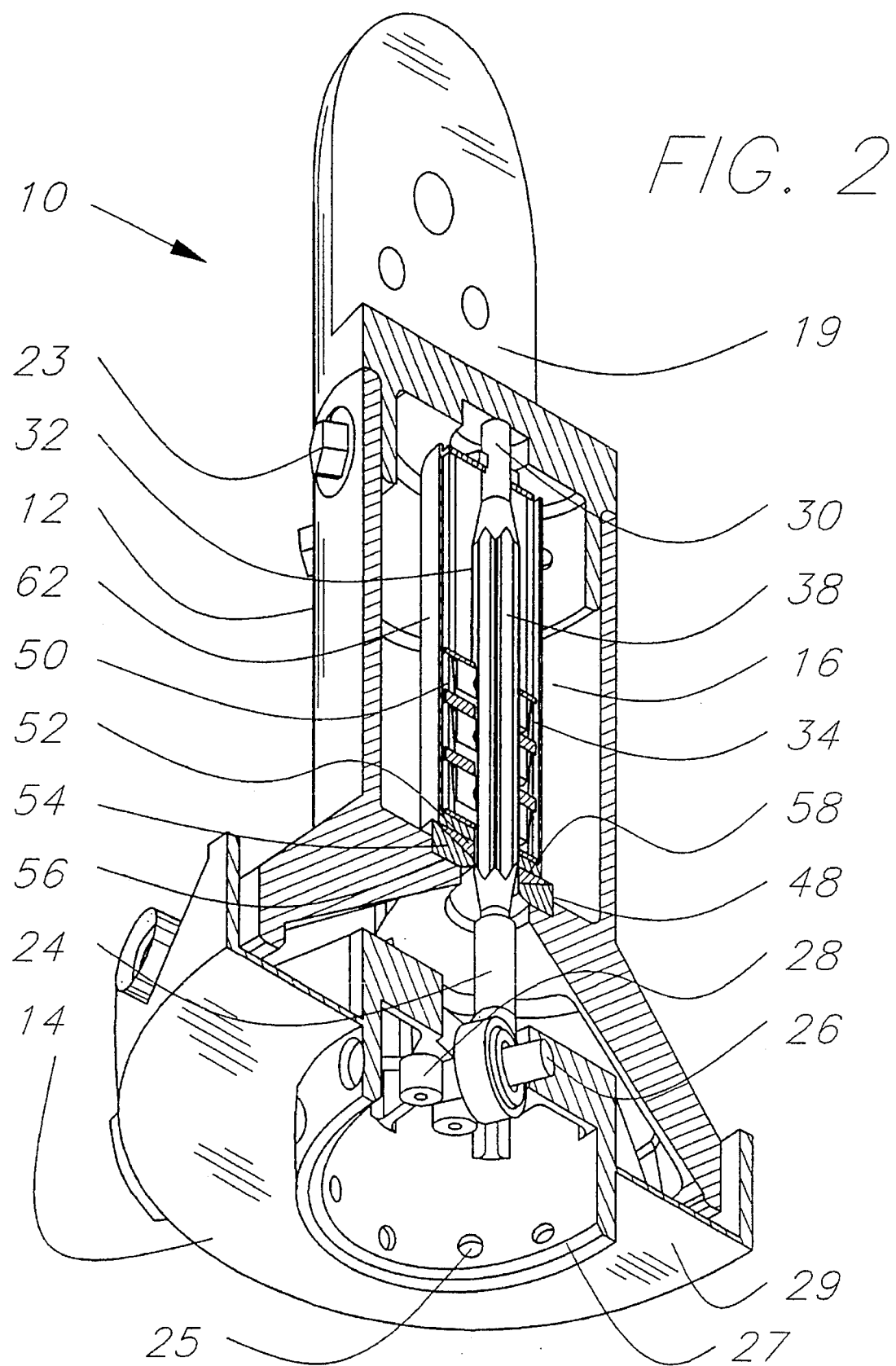
FIG. 2 is a perspective view, in section, of the load alleviator of FIG. 1.
Figure 3:
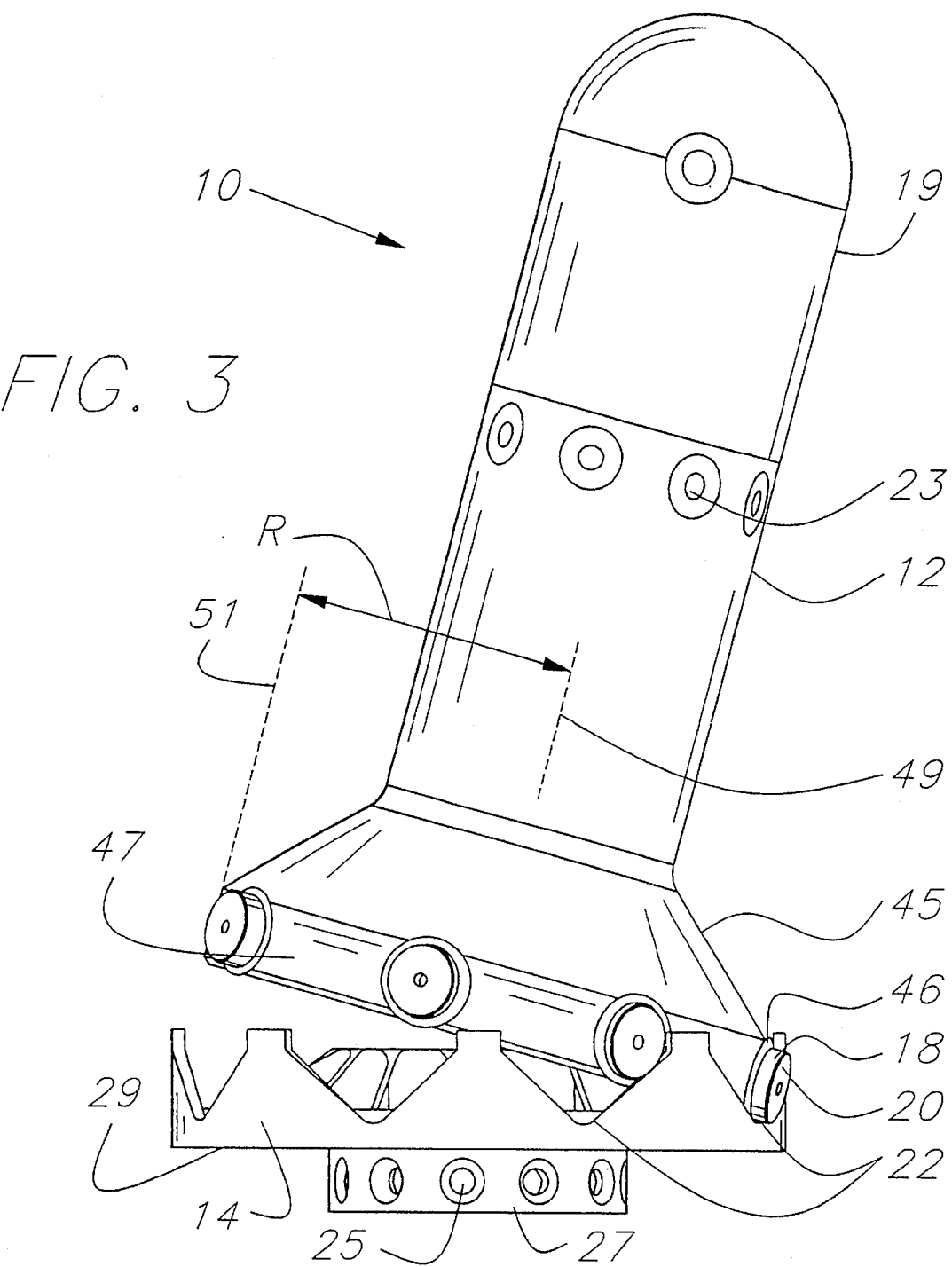
FIG. 3 is an elevational view of the load alleviator of FIG. 1 responding to bending actuation.

Referring now to the drawings, and more particularly to FIGS. 1–3, there is shown load alleviator 10 in accord with the present invention. Load alleviator 10 is a force transmitting and coupling apparatus for rotatably and pivotally driving a driven member such as a robot arm, hand tool element, or other driven member wherein an overload force protection apparatus may be desirable. For this purpose, load alleviator 10 is operable to limit torsional and bending forces that may be applied to the driven member.

FIG. 1 discloses three primary assemblies of a preferred embodiment of the present invention that include center housing 12, crown assembly 14, and energy dissipator assembly 16. It should be noted that a preferred embodiment energy dissipator assembly for the present invention is similar to or substantially the same as the energy dissipator shown in U.S. Pat. No. 5,197,573 to De La Fuente et al. that is hereby incorporated herein by reference. However, alternative design energy dissipators including off-the-shelf or custom designed shock absorbers could be used to effectively practice the present invention, depending on the specific application.

FIG. 1 discloses a relative rotational positioning of center housing 12 with respect to crown assembly 14 that may occur during torsion activation. FIG. 3 discloses a relative pivotal positioning of center housing 12 with respect to crown assembly 14 that may occur during bending actuation. A first load member 13 and a second load member 15 may be attached as desired to attachment ends 17 and 19 of load alleviator 10. Attachment end 19 is secured to load housing 12 with a plurality of circumferentially spaced screws 23. Similarly, circumferentially spaced threaded sockets 25 within protruding connection ring member 27 may be used to secure first load member 13 thereto with support from flat base 29. Either the first or second load members could be a driven member to be protected or alternatively could be a drive member that supplies force to the driven member through load alleviator 10. Due to the design of these mounting means, load alleviator 10 of the present invention can be placed in close proximity (within 0.25 inches) to the structure it protects.

As indicated in FIG. 1, torsion actuation above a predetermined level between center housing 12 and crown assembly 14 causes roller caps 18, which are mounted to rollers 20, to contact tapered portions of cam surfaces 22. The roller caps 18, rollers 20, and cam surfaces 22 are circumferentially spaced about center housing 12 and crown assembly 14, respectively. While the presently preferred embodiment uses eight of each related assembly of components 18, 20, 22 equidistantly spaced apart, the number of these assemblies can be changed to accommodate the specific application. As well, while cam surfaces and corresponding cam followers are discussed herein, in accordance with the presently preferred embodiment, other engagement surfaces, such as crown gears, could be modified for use in accord with principles embodied in this invention.

Rod end bearing assembly 24 of energy dissipator assembly 16 is secured to crown assembly 14 with dowel pin 26 (see FIG. 2) to provide a flexible connector therewith. Dowel pin 26 is preferably retained with retaining means such as set screws 28. Center housing 12 is pivotal in all directions relative to pin 26 and crown assembly 14 by virtue of rod end bearing assembly 24 which has semispherical bearing surfaces for permitting movement in any plane about the bearing pivot point. Rod end bearing assembly 24 thus permits tilting of housing 12 in any direction relative to the pin 26, which is fixed.

Thus, in this preferred embodiment, rod end bearing assembly 24 provides for a flexible connection to allow for angular displacement, rotational movement, and general pivotal movement between center housing 12 and crown assembly 14. Other pivotable, rotatable connectors that provide such movement could also be used, i.e., slip joints, universal joints, coil assemblies and/or combinations of the above.

It will be appreciated that as roller caps 18 move along cam surfaces 22 during relative rotation of center housing 12 with respect to crown assembly 14, an axial displacement or relative translational motion between center housing 12 and crown assembly 14 takes place such that center housing 12 initially moves apart or away from crown assembly 14 in a substantially axial direction as indicated by axial direction arrow 21. Element 21 is thus a directional arrow indicating movement of the center housing away from the crown assembly 14. One or more ring housings 34 are supported by center housing 12, as discussed hereinafter, and therefore move away from crown assembly 14 along with center housing 12. The relative movement of center housing 12 away from crown assembly 14 therefore causes shaft 32, that is pivotally secured to crown assembly 14, to move axially within one or more ring housings 34 so as to stroke energy dissipator 16. As a result of stroking energy dissipator 16, a substantial portion of the torsionally directed energy that caused the relative rotational and hence, axial relative movement between center housing 12 and crown assembly 14, is dissipated.

Once the energy is dissipated, then bias spring 42 induces relative axial movement of center housing 12 towards crown assembly 14 in the direction opposite to arrow 21. Thus, the bias force created by bias spring 42 also causes relative rotation between center housing 12 and crown assembly 14 but in the opposite direction as the rotation caused by the overload torsional force.

Due to the relative axial movement in load alleviator 10 it may be desirable, in some cases, to provide an axially moveable connection (not shown) such as a spline-groove connection, for instance, in a connection at some position between the external load and the drive member, to provide a responsive offset that accounts for the relative axial movement between center housing 12 and crown assembly 14 caused by relative rotation therebetween.

The operation of a preferred embodiment energy dissipator assembly 16 is discussed in detail in the above-designated patent, U.S. Pat. No. 5,197,573. For the purposes of this invention, it is sufficient to state that balls 36 (see FIG. 4) frictionally engage grooves 38 in shaft 32 and also frictionally engage tapered inner walls 40 of ring housings 34 to thereby frictionally dissipate the torsionally directed force into heat energy due to the resulting relative axial movement of shaft 32 within ring housings 34. The presently preferred embodiment of the invention, as disclosed, utilizes three of ring housings 34 but more or fewer of ring housings 34 could be used as desired for the amount of energy to be dissipated. As discussed hereinbefore, other types of energy dissipators could also be used such as dash pots or hydraulic shock absorbers. However, at least for use in outer space, it is desirable to use an energy dissipator that does not require use of fluids that would render such shock absorbers nonfunctional in a space environment.

After the excessively high torsional load is dissipated, then spring 42 provides a biasing force to automatically reset load alleviator back into a position where it is ready to prevent further overload forces. Spring 42 could be positioned elsewhere as desired, such as at another position along energy dissipator 16. A fitting 31 (see FIG. 1) adjacent end 30 of shaft 32 is used to secure the opposite end of energy dissipator 16 to spring 42 to thereby cause spring 42 to expand when center housing 12 moves away from crown assembly 14. The expansion of spring 42 produces a resetting force to automatically reset center housing 12 back into engagement with crown assembly 14 after the overload force is dissipated. Spring 42 is adjusted to provide a desired normal operating bias force to maintain engagement of center housing 12 and crown assembly 14 during normal operation. In order to provide at least one clear view of the internal components of energy dissipator 16, spring 42 is not shown in FIG. 2.

Referring again to FIG. 1, at the reset position or normal operating position, rollers 20 are positioned within groove or cam surfaces 22 at bottom position 44 therein. A torsional overload force can be predetermined and the slope of cam surfaces 22 designed accordingly in light of the fact that a greater overload force corresponds to a greater slope of cam surfaces 22. Generally, the greater the slope of cam surfaces 22, the greater the required overload force must be to move rollers 20 along cam surfaces 22. For instance, if the slope of cam surfaces 22 were 90° with respect to flat base 29, then the overload force required would, theoretically, be infinite. On the other hand, if the slope of cam surfaces 22 were 0° or parallel to flat base 29, then assuming no friction, the overload force to induce relative rotation between center housing 12 and crown assembly 14 would be zero. Thus, the predetermined torsional overload force can be set substantially independently of the predetermined bending overload force that will be discussed hereinafter by design of the slope of cam surfaces 22. Related factors to design for the desired torsional overload force also include, for instance, the bias force of spring 42 and the energy dissipation level design of the energy dissipator 16 including frictional elements, i.e., shaft 32, balls 36, taper surfaces 40, and related friction biasing elements discussed hereinafter.

Referring now to FIG. 3 wherein a lateral force or moment has been applied to center housing 12 or crown assembly 14, it will be seen that center housing 12 pivots at the contact points of roller hat flanges 46 with cam surfaces 22. The shear load applied by roller hat flange 46 is transmitted to crown assembly 14. In this manner, a lateral force applied to crown assembly 14 or center housing 12 produces an angular deflection resulting in relative pivotal or rotational movement of center housing 12 away from crown assembly 14. This motion causes energy dissipator assembly 16 to stroke, in the manner discussed hereinbefore, to thereby dissipate the lateral or bending force that prompted the relative pivotal movement between center housing 12 and crown assembly 14. As well, spring 42 applies a restoring force to reset center housing 12 relative to crown assembly 14 in the ready position where they are normally constrained in a fixed, centered alignment with respect to each other and dissipator assembly 16.

The radius R between the center axis of center housing 12 and roller hat flange 46 can be designed independently of other factors to determine the overload bending force that results in a pivotal motion of center housing 12 with respect to crown assembly 14. It will be appreciated that the bias force from spring 42 acting substantially along center housing axis 49 times the distance R creates a moment or force that must be overcome by an overload bending force before any angular displacement between center housing 12 and crown assembly 14 will take place. The overload bending force level may be independently designed as compared to the torsional overload force level discussed hereinbefore by selective design of the cam surfaces 22 (FIG. 1). The torsional overload force and bending force are both adjustable by varying R or the shock absorber frictional forces and/or the spring forces. Center housing 12 has a frusto-conical portion 45 to provide support for center housing end 47 having the desired circumference 51. If desired, a flange member could also be used. The radius between the center axis of center housing 12 and cam surfaces 22 will be slightly larger than radius R to allow a reasonably close fitting therebetween.

FIGS. 1 and 2 disclose a presently preferred design of a spherical washer assembly 48 that allows for pivotal movement of center housing 12 with respect to crown assembly 14. Spherical washer assembly 48 provides a load path from load dissipator assembly 16 into center housing 12. It also allows for the relative displacement of frictional element section 50 and center housing 12 with respect to crown assembly 14. In this embodiment, spherical washer assembly includes convex spherical washer 52 and mating concave spherical washer 54. The opposite sides of curved/rounded surfaces of washers 52 and 54 are preferably flat or otherwise shaped to mate to their respective mounting surfaces 56 and 58. Thus, center housing 12 is effectively secured to ring housings 34 via spherical washer assembly 48.

Figure 4:
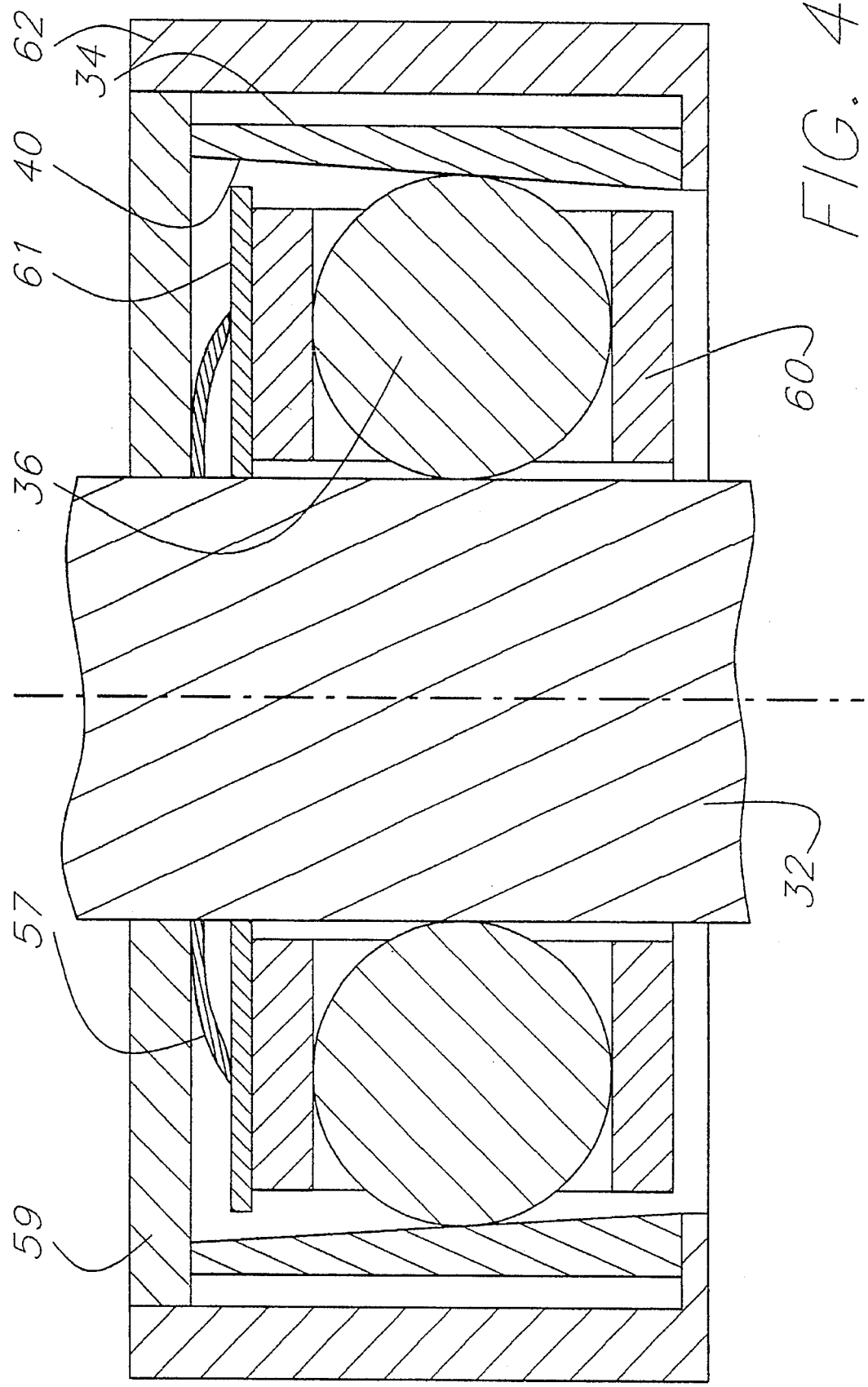
FIG. 4 is an elevational view, in section, of a pre-load washer configuration in accord with the present invention.

Referring now to FIG. 4, there are disclosed means for adjusting the initial dead band for the presently preferred energy dissipator assembly 16. As a result of preload adjustment of spring washer 57, energy dissipator 16 can begin dissipating energy right from the initial motion if desired. Especially for short strokes, prior an devices typically offer no energy dissipation for approximately 30–50% of the stroke. Thus, preload washer 61, that is biased by spring washer 57 and spacer washer 59, acts to adjust and minimize, if necessary, the initial dead band (ramp up to stroke load). This adjustment results in biasing bearing retainer 60 downwardly to result in more immediate frictional contact between balls 36, tapered surface 40, and shaft 32. It will be appreciated from FIG. 4 and from review of U.S. Pat No. 5,197,573, designated hereinbefore for a preferred embodiment energy dissipator 16, that tapered surfaces 40 can be designed so that a greater amount of torsional or bending force energy will be dissipated into heat energy during the setting stroke than during the resetting stroke of energy dissipator 16 produced by biasing spring 42. As well while energy dissipator 16 may be designed to provide a substantially constant energy dissipation, it could also be designed to produce a variable energy dissipation if desired, such as with variations in shaft 32 diameter. An energy dissipator outer housing 62 may be provided to conveniently retain the various components therein. The number of ring housings 34 disposed within outer housing 62 may be increased or decreased as desired depending on the amount of energy to be dissipated.

In operation, both bending and torsional forces above a predetermined level are converted into relative pivoting or axial translation, respectively, of crown assembly 14 with respect to center housing 12. Both actions result in relative axial movement of shaft 32 with respect to ring housing 34 to thereby dissipate energy of the overload forces at a desired rate of dissipation. A spring bias is used to automatically reset the crown assembly 14 with respect to center housing 12 to an initial locked position ready to provide further load protection.

The foregoing disclosure and description of the invention is illustrative and explanatory thereof, and it will appreciated by those skilled in the art, that various changes in the size, shape and materials as well as in the details of the illustrated construction or combinations of features of the various load alleviator elements may be made without departing from the spirit of the invention.

What is claimed is:

1. A load alleviator, comprising:

a crown assembly having a plurality of cam surfaces circumferentially spaced about a portion thereof, a center housing having an end portion thereof engageable with said crown assembly, said end portion having thereon a plurality of cam followers for engaging respective ones of said plurality of cam surfaces;

an energy dissipator having a dissipator body and an elongate member, said elongate member being axially moveable within said dissipator body member, said energy dissipator being operable to dissipate energy as a result of relative axial movement between said dissipator body and said elongate member;

first and second connectors for securing said crown assembly to said center housing, said first connector mounting said energy dissipator with respect to said crown housing, said second connector mounting said energy dissipator with respect to said center housing, said first and second connectors being operative to allow a range of angular deflection of said crown assembly relative to said center housing; and a biasing member for biasing said crown assembly relative to said center housing.

2. The load alleviator of claim 1, wherein:

said energy dissipator is operable to dissipate more energy as a result of relative movement of said crown assembly away from said center housing than as a result of relative movement of said crown assembly toward said center housing.

3. The load alleviator of claim 1, wherein:

said first and second connectors are operable to allow relative rotation between said crown assembly and said center housing.

4. The load alleviator of claim 1, wherein:

said cam followers are comprised of substantially round rollers.

5. The load alleviator of claim 1, wherein said first connector further comprises:

a pivotal member.

6. The load alleviator of claim 1, wherein said second connector further comprises:

a bearing member for supporting said dissipator body, said beating member having a first surface and a second surface opposite said first surface, said first surface being substantially rounded to support said dissipator body with said angular deflection of said crown assembly relative to said center housing.

7. A load alleviator, comprising:

a crown assembly having a plurality of cam surfaces circumferentially spaced about a portion thereof;

a center housing relatively moveable with respect to said crown assembly and having an end portion, said end portion having thereon a plurality of cam followers;

a first biasing member for biasing said crown assembly toward said center housing such that said cam followers are biased towards engagement with said cam surfaces, said cam surfaces being profiled such that relative rotation in a first direction of said center housing with respect to said crown assembly results in movement of said crown assembly away from said center housing and such that subsequent relative rotation in an opposite direction results in movement of said crown assembly toward said center housing responsively to said first biasing member; and an energy dissipator secured to said crown assembly and said center housing, said energy dissipator being operable to dissipate more energy as a result of said relative movement of said crown assembly in a direction away from said center housing than as a result of relative movement of said crown assembly in a direction toward said center housing.

8. The load alleviator of claim 2, further comprising:

a flexible connector for said energy dissipator operative to allow substantial angular deflection of said crown assembly with respect to said center housing.

9. The load alleviator of claim 7, said energy dissipator having a dissipator body and an elongated dissipator member relatively moveable within said dissipator body, further comprising:

a second biasing member disposed within said dissipator body operable for controlling an initial energy dissipation level as a result of said relative movement between said dissipator body and said elongate dissipator member.

10. The load alleviator of claim 7, wherein:

said energy dissipator includes frictionally resistive elements.

11. The load alleviator of claim 7, further comprising:

said energy dissipator includes substantially spherical elements having frictionally contactable surfaces for dissipating energy.

12. The load alleviator of claim 7, wherein:

said energy dissipator is secured to a central portion of said crown assembly and to a central portion of said center housing.

13. A method for limiting torsional and bending forces to a driven member, comprising the steps of:

biasing a first member toward a second member;

providing a torsional force converter for converting torsional force above a predetermined level applied between said first and second members into relative axial movement of said first member with respect to said second member;

providing a lateral force converter for converting lateral force above a predetermined level applied to at least one of said first and second members into pivotal movement of said first member with respect to said second member; and securing at least one of said first and second members to said driven member.

14. The method of claim 13, further comprising:

providing an energy dissipator for absorbing a significant amount of energy associated with said relative axial and said pivotal movement.

15. The method of claim 14, wherein said energy dissipator dissipates less energy during resetting than as a result of said torsional or said lateral force above said predetermined level that produce, respectively, said relatively axial and said pivotal movement.

16. The method of claim 14, further comprising:

adjusting said energy dissipator to dissipate energy at a predetermined rate of dissipation.

17. The method of claim 13, further comprising:

providing an energy dissipator with a shaft and a housing relatively moveable with respect to each other for dissipating energy; and connecting said shaft to said first member and said housing to said second member.

18. The method of claim 17, further comprising:

adjusting a stroke length of a dead band for an initial movement of said shaft with respect to said housing.

19. The method of claim 13, wherein the step of providing a torsional force converter includes:

providing cam surfaces on one end of said first member; and providing cam followers on a corresponding end of said second member.

20. The method of claim 13, wherein said step of biasing further comprises:

constraining said first and second members into a centered alignment with respect to each other.

21. The method of claim 20, wherein said step of biasing further comprises:

resetting said first and second members into said centered alignment with respect to each other after either said relative axial or pivotal movement.

22. The method of claim 13, further comprising:

selecting said predetermined level for said torsional force; and selecting said predetermined level for said lateral force substantially independently of said step of setting said predetermined level for said torsional force.

* * * * *